United States Patent [19]

Hoves et al.

[11] 4,004,204
[45] Jan. 18, 1977

[54] METHOD FOR REGULATING THE MATERIAL SUPPLY TO A PROCESSING MACHINE HAVING AN ELECTRIC DRIVE MOTOR

[76] Inventors: Hans Hoves, Auf der Kicken 17, 5 Cologne 80; Paul Kunath, Nibelungenstrasse 22, 5 Cologne 60; Herbert Uttelbach, Zu den Dolinen, 56 Wuppertal 2, all of Germany

[22] Filed: Dec. 12, 1973

[21] Appl. No.: 426,636

[30] Foreign Application Priority Data

Dec. 12, 1972 Germany .................... 2260688

[52] U.S. Cl. .............................. 318/472; 318/571
[51] Int. Cl.² ........................................ H02H 5/04
[58] Field of Search ........... 318/471, 472, 473, 39, 318/561, 571

[56] References Cited

UNITED STATES PATENTS

| | | | |
|---|---|---|---|
| 3,139,217 | 6/1964 | Mell .................................. 318/39 X |
| 3,190,139 | 6/1965 | Swanson et al. .................. 318/39 X |
| 3,629,676 | 12/1971 | Ephraim et al. .................... 318/144 |
| 3,646,396 | 2/1972 | Fischer .............................. 317/13 B |
| 3,789,279 | 1/1974 | Dempsey et al. .................... 318/39 |

*Primary Examiner*—Robert K. Schaefer
*Assistant Examiner*—John J. Feldhaus
*Attorney, Agent, or Firm*—Hill, Gross, Simpson, Van Santen, Steadman, Chiara & Simpson

[57] ABSTRACT

A method for regulating the material feed to a processing machine, particularly a comminuting machine wherein the actual value of the temperature of the motor winding or windings is measured with the aid of a temperature sensor and is compared in a control regulator with a predetermined theoretical or reference temperature which lies somewhat below the maximum permissible winding temperature of the motor. The difference between the actual value and the reference value effects production of a signal which is applied to an auxiliary regulator for comparison with the actual motor current to derive a reference speed signal for comparison with the actual speed of the aggregate feed conveyor for adjusting aggregate feed.

11 Claims, 2 Drawing Figures

METHOD FOR REGULATING THE MATERIAL SUPPLY TO A PROCESSING MACHINE HAVING AN ELECTRIC DRIVE MOTOR

BACKGROUND OF THE INVENTION

1. Field of the Invention

This invention relates to a method for regulating material supplied to a processing machine which has an electric drive motor and a conveyor assembly associated therewith for feeding material to the processing machine, and in particular to machines which undergo variations in loading such as comminuting machines.

2. Description of the Prior Art

It was heretofore the practice in crushing installations, for example, to supply material to the crusher and to regulate the supply in accordance with the current intake of the crusher drive motor. As in many cases the composition of the stream of material supplied to the crusher over a period of time is different with regard to comminution characteristics, fluctuations in loading of the crushing installation result. Because of this, the crusher is not optimally utilized, and may become overloaded. Furthermore, the output of the crusher installation is limited by the maximum permissible winding temperature of the electric drive motor and in case of overloading of the crusher installation short circuits of the drive motor may arise and lead to expensive interruptions in crusher operation.

SUMMARY OF THE INVENTION

The object of the present invention resides in the provision of a method for regulating the material supplied to a processing machine which has an electric drive motor, which method, while preventing the aforementioned disadvantages, makes possible an optimum utilization of the electric drive motor.

This problem is solved and the aforementioned object is achieved in a method in which the actual value of the temperature of the motor winding is measured with the aid of a temperature feeler and compared with a predetermined theoretical temperature value in a control regulator. The predetermined temperature value is selected to be somewhat below the maximum permissible winding temperature of the drive motor. In response to a difference between actual and theoretical values, a signal is generated by the regulator and applied to an auxiliary regulator as a theoretical value for comparison with the actual value of current intake of the drive motor to obtain a theoretical speed value for material feed. The theoretical speed value is compared with the actual value of speed of the material conveyor in a speed regulator to obtain a speed regulating signal for the feed conveyor. By means of this regulating method, very advantageously a maximum utilization of the processing machine and the electric drive motor is attained. In comparison with known regulating methods, this type of control brings with it an essentially higher amount of material processing output of the processing machine. Beyond this, and due to the fact that according to the present invention the actual value of temperature of the motor winding is referred to the regulation of the material supplied to the processing machine, it is reliably prevented that short circuits of the motor winding arise and the attendant disadvantages of interruptions in operation are obviated. The method of the present invention therefore provides an increase in reliability of operation.

In a further advantageous development of the invention, the temperature measurement takes place on at least two windings of the drive motor, whereby for regulation as an actual value of the temperature in each case, the highest temperature value is employed. In this manner, exceeding the maximum permissible temperature in the individual motor windings is reliably prevented. If, however, upon operation of the drive motor the highest temperature value predetermined for the control regulator is exceeded, than very advantageously the drive motor of the feed conveyor is disconnected.

In a further advantageous development of the invention, the signal of the actual value of the current intake of the drive motor is converted into the loss output of the drive motor and, after smoothing of the signal thus received, is applied to the auxiliary regulator. In this manner, undesired amplifications in the control circuit are removed and regulation is enhanced.

BRIEF DESCRIPTION OF THE DRAWINGS

Other objects, features and advantages of the invention, its organization, construction and operation will be best understood from the following detailed description of preferred embodiments of the invention taken in conjunction with the accompanying drawing, on which.

DESCRIPTION OF THE PREFERRED EMBODIMENT

Figure 1:
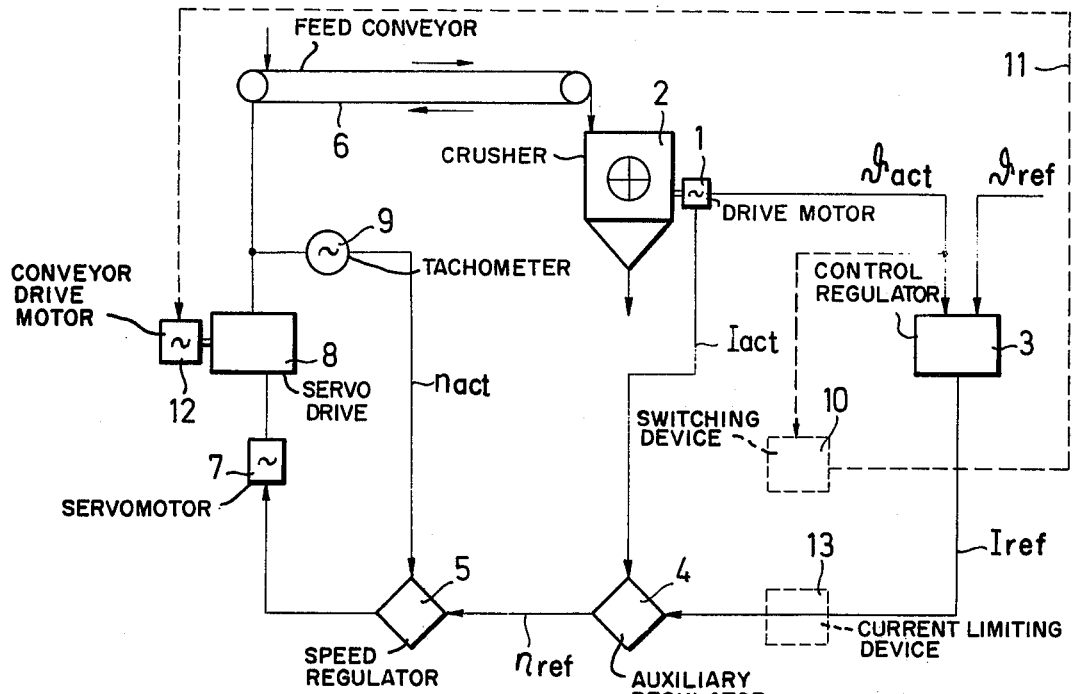
FIG. 1 is a schematic diagram of a crusher control system constructed in accordance with the present invention.

Referring to FIG. 1, the actual value $\Theta_{act}$ of the temperature of the winding of an electric drive motor 1 of a processing machine 2, for example a crusher installation, is measured with the aid of temperature feelers which are well known in the art but not shown in detail in the drawing, and compared in a control regulator 3 with a predetermined temperature reference or theoretical value $\Theta_{ref}$, which is selected to be somewhat below the maximum permissible winding temperature of the drive motor 1.

As a temperature difference occurs between the actual and reference values, the control regulator 3 generates a signal $I_{ref}$ and applies the same to an auxiliary regulator 4 as a current reference value. In the auxiliary regulator 4 the current reference value $I_{ref}$ is compared with the actual value $I_{act}$ of the current intake of the drive motor 1, and depending on these values, a theoretical speed value $\eta_{ref}$ is provided to a speed regulator 5 for comparison with the actual speed value $\eta_{act}$ of the driving speed of a feed conveyor 6.

The difference in speed denoted by these speed values causes the speed regulator 5 to generate a signal and apply the same to a servomotor 7 to control a servo drive 8 which is driven by the conveyor drive motor 12. As illustrated in FIG. 1, a tachometer 9 is provided for generating a signal which indicates actual speed of the conveyor to the speed regulator 5.

If during the operation of the processing machine 2 for some reason the electric drive motor 1 becomes loaded such that the maximum permissible winding temperature is exceeded, a switching device 10 operates in response to the actual temperature signal to cause, by way of a connection 7, a complete disconnection of the drive motor 12 so that the material feed is stopped and the electric drive motor has the opportunity to become unloaded and cool. In this manner, very advantageously the motor windings are protected from overheating and in this manner short circuits of the motor are prevented. The switching device 10, however, responds only upon a sudden very strong overheating of the drive motor above the maximum permissible winding temperature to disconnect the conveyor drive. Upon normal temperature rise in the winding of the drive motor up to the maximum permissible highest value, to the contrary, through the control circuit according to the invention, the belt speed of the conveyor 6 is decreased and thereby the feed of material of the processing material is decreased. In this manner, the processing machine 2 and the drive motor 1 are correspondingly relieved of load until the winding temperature again decreases to a point below the maximum permissible temperature. However, in order that the temperature of an individual winding is not exceeded, the temperature of each winding of the drive motor is measured and the highest temperature is utilized as the actual value for regulation.

In order to make possible an automatic starting of the drive motor 1 from its cold condition, a device 13 is interposed between the control regulator 3 and the auxiliary regulator 4 to limit the output signal of the control regulator 3 during starting to compensate for current inrush. In this manner very advantageously the maximum permissible motor current may be exceeded for a short time upon starting without influencing the control circuit.

Figure 2:
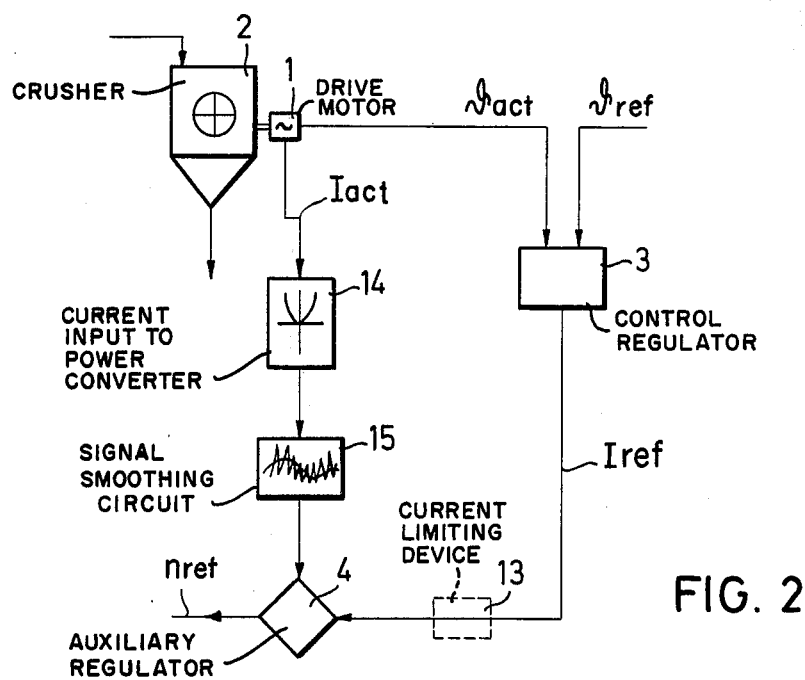
FIG. 2 illustrates, in schematic form, a portion of the apparatus of FIG. 1 having added thereto means for converting the drive motor current into a loss output signal for use in controlling the feed conveyor.

In order to equalize fluctuations in measuring and comparing sizes or amounts of the control circuit according to the invention, FIG. 2 illustrates means whereby very advantageously the signal of the actual value of the current intake of the drive motor is converted by an analog converting circuit 14 into the loss output of the drive motor for use by the auxiliary regulator 4 after first smoothing the signal in a signal smoothing circuit 15.

Each of the regulator circuit, switching devices, signal limiting devices, servo equipment, converters and smoothing circuits and the like are well known in the art per se and well within the skill of the craftsman to utilize in practicing the present invention.

Through the regulating method of the invention, therefore, a uniform maximum equalization of the electric drive motor and an optimum equalization of the processing machine may very advantageously be attained. In addition, with the circuit arrangement according to the invention, both the drive motor and the circuit components are reliably protected from current overload.

Although we have described our invention by reference to particular exemplary embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim as our invention:

1. A method of regulating the material feed to a processing machine which is driven by an electric drive motor, comprising the steps of:
   sensing the temperature of a drive motor winding;
   generating a first signal representative of the temperature sensed;
   generating a reference second signal to represent less than the maximum permissible winding temperature;
   comparing the first signal with the reference second signal and providing a third signal which is a function of said first and second signals;
   sensing actual motor current to provide a fourth signal;
   comparing said third signal with said fourth signal and providing a fifth signal which is a function of the third and fourth signals and representing desired material feed;
   sensing actual material feed to provide a sixth signal;
   comparing said fifth and sixth signals and providing a seventh signal which is a function of the fifth and sixth signal;
   and applying said seventh signal to the material feed drive to adjust the material feed rate.

2. The method according to claim 1:
   wherein said step of temperature sensing includes the steps of sensing the temperature of each winding of the drive motor and selecting the highest temperature sensed for use in generating said first signal.

3. The method according to claim 1:
   including the step of disconnecting the material feed drive in response to sensing a temperature exceeding the maximum permissible winding temperature.

4. The method according to claim 1:
   including the step of limiting the third signal during initial drive motor starting.

5. The method according to claim 1:
   including the steps of converting sensed motor current to an analog form representing power loss of the drive motor and smoothing the converted signal for use as the third signal.

6. A controlled processing machine with a material feed comprising in combination:
   an electric drive motor for driving a processing machine;
   first signal means sensing the temperature of the drive motor winding and generating a first signal;
   second signal means generating a reference second signal to respesent a value less than the maximum permissible winding temperature of said motor;
   means comparing said first and second signals and generating a third signal as a function of said first and second signals;
   a feed conveyor for feeding material to the processing machine;
   and control means for the feed conveyor controlled as a function of said third signal and controlling the feed conveyor.

7. A controlled processing machine with a material feed constructed in accordance with claim 6:
   wherein said control means controls the speed of said feed conveyor.

8. A controlled processing machine with a material feed constructed in accordance with claim 6:
   wherein said control means terminates operation of the feed conveyor at a predetermined value of said third signal.

9. A controlled processing machine with a material feed constructed in accordance with claim 6:
   including means limiting the value of said third signal at starting of said electric drive motor.

10. A controlled processing machine with a material feed constructed in accordance with claim 6:
including means for sensing the actual motor current of said drive motor and generating a fourth signal as a function thereof;
means comparing said third signal with said fourth signal and generating a fifth signal as a function of said third and fourth signals;
means sensing the rate of material feed to provide a sixth signal as a function thereof;
means comparing said fifth and sixth signals and generating a seventh signal as a function thereof;
and means applying said seventh signal to the control means for the feed conveyor for controlling the operation of the feed conveyor as a function of said seventh signal.

11. A method of regulating the material feed to a processing machine driven by an electric drive motor comprising the steps of:
sensing the temperature of a drive motor winding of a motor for driving a processing machine;
generating a first signal representative of said sensed temperature;
generating a reference second signal representative of a value less than the maximum permissible winding temperature of the drive motor;
comparing said first and second signals and controlling the operation of the material feed to the processing machine as a function of the difference between said second and third signals.

* * * * *